US010789280B2

(12) United States Patent
Roy et al.

(10) Patent No.: US 10,789,280 B2
(45) Date of Patent: Sep. 29, 2020

(54) IDENTIFICATION AND CURATION OF APPLICATION PROGRAMMING INTERFACE DATA FROM DIFFERENT SOURCES

(71) Applicant: EMC IP Holding Company LLC, Hopkinton, MA (US)

(72) Inventors: Mainak Roy, Bangalore (IN); Chitrak Gupta, Bangalore (IN); Abhirup Seal, Kolkatta (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 181 days.

(21) Appl. No.: 16/041,353

(22) Filed: Jul. 20, 2018

(65) Prior Publication Data
US 2020/0026798 A1   Jan. 23, 2020

(51) Int. Cl.
| | |
|---|---|
| *G06F 7/00* | (2006.01) |
| *G06F 16/35* | (2019.01) |
| *G06N 3/08* | (2006.01) |
| *G06F 9/54* | (2006.01) |
| *G06K 9/62* | (2006.01) |
| *G06F 16/21* | (2019.01) |

(52) U.S. Cl.
CPC ............ *G06F 16/35* (2019.01); *G06F 9/54* (2013.01); *G06F 16/211* (2019.01); *G06K 9/6268* (2013.01); *G06N 3/08* (2013.01)

(58) Field of Classification Search
CPC ......... G04F 16/35; G06F 16/211; G06F 9/54; G06K 9/6268; G06N 3/08

USPC ................................... 700/600–899
See application file for complete search history.

(56) References Cited

U.S. PATENT DOCUMENTS

| | | | |
|---|---|---|---|
| 6,212,530 B1 | 4/2001 | Kadlec | |
| 7,096,420 B1 | 8/2006 | Peikes | |
| 2016/0103823 A1* | 4/2016 | Jackson, Jr. | ......... G06F 40/205 704/9 |

OTHER PUBLICATIONS

Tensor Layer Contributors, "API—Natural Language Processing—TensorLayer 1.9.0 Documentation," http://tensorlayer.readthedocs.io/en/latest/modules/nlp.html, downloaded on Jun. 27, 2018, 10 pages.

(Continued)

*Primary Examiner* — Isaac M Woo
(74) *Attorney, Agent, or Firm* — Ryan, Mason & Lewis, LLP

(57) ABSTRACT

A method in one embodiment comprises receiving as inputs a plurality of application programming interface (API) documents respectively configured as electronic files, analyzing the electronic files via a first classifier to determine whether one or more schema types are present in the electronic files, generating a first classification based on the schema types for the electronic files determined to include the schema types, analyzing the electronic files via a second classifier for the electronic files determined not to include the schema types, wherein the analyzing via the second classifier is performed using one or more predictive classifiers generated via one or more machine learning techniques, generating a second classification based on the predictive classifiers for the electronic files determined not to include the schema types, and outputting a plurality of classified API documents based on the first and second classifications.

20 Claims, 5 Drawing Sheets

(56) References Cited

OTHER PUBLICATIONS

Lynne Maynard, "ECS 3.0 Product Documentation," https://community.emc.com/docs/DOC-53956, Jul. 13, 2016, 3 pages.

Dell EMC, "Unisphere Management REST API Programmer's Guide," https://www.emc.com/collateral/TechnicalDocument/docu69331.pdf, Dell EMC Unity Family Verssion 4.3, Jan. 2018, 122 pages.

help.boomi.com, "Master Data Hub REST APIs," http://help.boomi.com/mdm/GUID-457504D2-5A67-4EBB-B8CB-D6E1159BB388.html, downloaded Jun. 27, 2018, 125 pages.

Jason Brownlee, "How to Develop a Deep Learning Bag-of-Words Model for Pedicting Movie Review Sentiment," https://machinelearningmastery.com/deep-learning-bag-of-words-model-sentiment-analysis/, Oct. 20, 2017, 38 pages.

Olga Davydova, "7 Types of Artificial Neural Networks for Natural Language Processing," http://medium.com/@datamonsters/artificial-neural-networks-for-natural-language-processing-part-1-64ca9ebfa3b2, Sep. 26, 2017, 13 pages.

R. Collobert et al., "Natural Language Processing (almost) from Scratch," https://arxiv.org/pdf/1103.0398.pdf, Mar. 2, 2011, 47 pages.

tensorlayer.readthedocs.io, "API—Natural Language Processing," http:tensorlayer.readthedocs.io/en/latest/modules/hlp.html#iteration-fnction-for-training-embedding-matrix, Jul. 17, 2018, 18 pages.

Wikipedia, "Application Programming Interface," https://en.wikipedia.org/wiki/Application_programming_interface, Jul. 13, 2018, 8 pages.

Vangie Beal, "API—Application Program Interface," https://www.webopedia.com/TERM/A/API.html, 6 pages.

Wikipedia, "Word2vec," https://en.wikipedia.org/wiki/Word2vec, Jun. 21, 2018, 6 pages.

www.dell.com, "Consulting for Microsoft SharePoint and SharePoint Online," https://www.dell.com/en-us/work/learn/sharepoint-and-onedrive-for-business, retrieved Jul. 26, 2018, 5 pages.

Donna Harman, "Information Retrieval: Chapter 3: Inverted Files," http://orion.lcg.ufrj.br/Dr.Dobbs/books/book5/chap03.htm, retrieved Jul. 12, 2018, 12 pages.

The Compuer Languag Company Inc., "Inverted File Definition from PC Magazine Encyclopedia," https://www.pcmag.com/encyclopedia/term/45332/inverted-file, retrieved Jul. 12, 2018, 2 pages.

Wikipedia, "PHP," https://en.wikipedia.org/wiki/PHP, Jul. 27, 2018, 24 pages.

Wikipedia, "Query Expansion," https://en.wikipedia.org/wiki/Query_expansion, Jul. 7, 2018, 3 pages.

DMTF, "Redfish API," https://www.dmtf.org/standards/redfish, 2018, 8 pages.

help.arcgis.com, "ArcGIS Resource Center: Versioned Database," http://help.arcgis.com/en/geodatabase/10.0/sdk/arcsde/concepts/versioning/basicprinciples/versioneddatabase.htm, retrieved Jul. 12, 218, 1 page.

endoc.esri.com, "Getting Started: What is a Versioned Database?" http://edndoc.esri.com/arcsde/9.1/general_topics/what_versioned-dbase.htm, retrieved Jul. 12, 2018, 4 pages.

Wikipedia, "WS-Management," https://en.wikipedia.org/wiki/WS-Management, Sep. 10, 2017, 3 pages.

U.S. Appl. No. 16/041,353 filed in the name of Mainak Roy et al. filed Jul. 20, 2018 and entitled "Identification and Curation of Application Programming Interface Data from Different Sources."

* cited by examiner

IDENTIFICATION AND CURATION OF APPLICATION PROGRAMMING INTERFACE DATA FROM DIFFERENT SOURCES

FIELD

The field relates generally to information processing systems, and more particularly to identifying and organizing application programming interface (API) data from different source files.

BACKGROUND

Unifying redundant technologies is important for organizational success, and it has become important to achieve synergy within an organization among the computer technology products which may be coming from different sources.

For example, products carry the identity of the corresponding organization, and it has become important for computer based products, such as application programming interfaces (APIs) to have the same structure, look and feel across the product lines. The effect may be incremental as the customers start consuming information with the same look and feel from different sources, and trust is built over time.

At present, whenever there is a requirement for an API document, in order to define a suitable format for their organization, analysts must classify existing input files, including, for example, existing API guides, of which there may be thousands of examples based on the number of programs, number of product versions, number of releases and number of product documents. The process requires an inordinately large amount of time and computer and human resources for content creation and content validation.

Accordingly, there is a need for an improved computer driven structure and process which is capable of differentiating between different types of content sets and determining whether the content sets are suitable for API documentation.

SUMMARY

In one embodiment, an apparatus comprises at least one processing platform including a plurality of processing devices. The processing platform is configured to receive as inputs a plurality of application programming interface (API) documents, wherein the plurality of API documents are respectively configured as electronic files, analyze the electronic files via a first classifier to determine whether one or more schema types are present in the electronic files, generate a first classification based on the one or more schema types for the electronic files determined to include the one or more schema types, analyze the electronic files via a second classifier for the electronic files determined not to include the one or more schema types, wherein the analyzing via the second classifier is performed using one or more predictive classifiers generated via one or more machine learning techniques, generate a second classification based on the one or more predictive classifiers for the electronic files determined not to include the one or more schema types, and output a plurality of classified API documents based on the first and second classifications.

These and other illustrative embodiments include, without limitation, apparatus, systems, methods and computer program products comprising processor-readable storage media.

DETAILED DESCRIPTION

Figure 1:
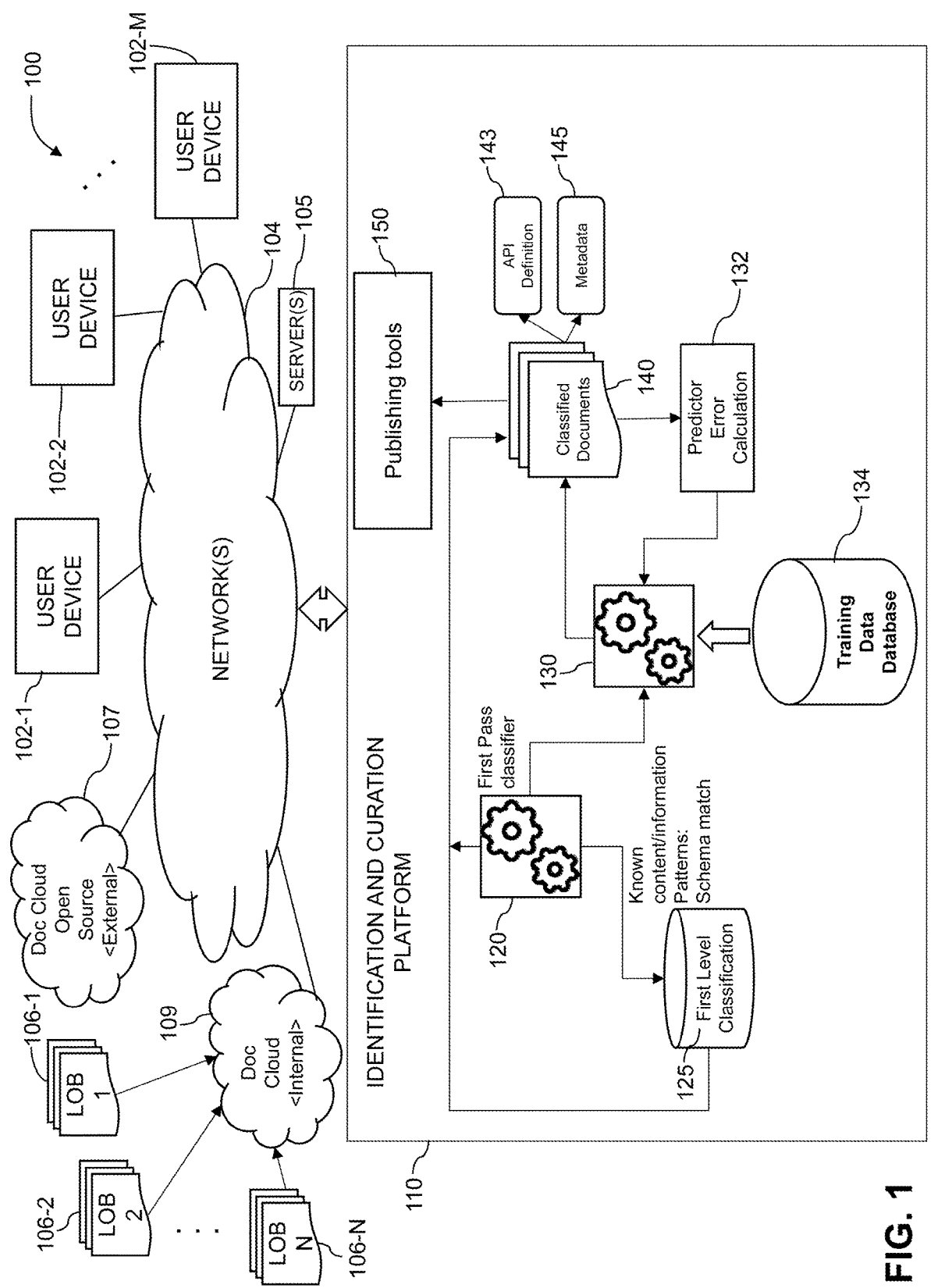
FIG. 1 is a block diagram of an information processing system comprising an identification and curation platform configured for identifying and organizing application programming interface (API) data from different source files in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

As used herein "application programming interface (API)" refers to a set of subroutine definitions, protocols, and/or tools for building software. Generally, an API defines communication between software components. APIs permit programmers to write software applications consistent with an operating environment or website.

As used herein "application programming interface (API) documents" and "application programming interface (API) documentation" provide users with descriptions of the services offered by an API, and how to use those services. API documentation provides users with necessary information to develop and maintain applications using an API. Restrictions and/or limitations regarding API use may also be set forth in the documentation. API documentation can be retrieved from a variety of sources, including, but not limited to, databases of documentation files, blogs, forums, and question and answer websites. API documentation may include metadata information like Java annotations, which can be used by software components to implement custom behaviors or custom handling of the API.

FIG. 1 shows an information processing system 100 configured in accordance with an illustrative embodiment. The information processing system 100 comprises user devices 102-1, 102-2, . . . 102-M (collectively "user devices 102). The user devices 102 communicate over a network 104 with an identification and curation platform 110.

The user devices 102 can comprise, for example, desktop, laptop or tablet computers, mobile telephones, or other types of processing devices capable of communicating with the identification and curation platform 110 over the network 104. The variable M and other similar index variables herein such as K, L, N, X, Y and Z are assumed to be arbitrary positive integers greater than or equal to two.

The term "user" herein is intended to be broadly construed so as to encompass numerous arrangements of human, hardware, software or firmware entities, as well as combinations of such entities. Identification and curation services are assumed to be provided for users utilizing one or more machine learning models, although it is to be appreciated that other types of infrastructure arrangements could be used. At least a portion of the available services and functionalities provided by the identification and curation platform 110 in some embodiments may be provided under Function-as-a-Service ("FaaS") and/or Platform-as-a-Service (PaaS) models, including cloud-based FaaS and PaaS environments.

The identification and curation platform 110 in the present embodiment is assumed to implement at least a portion of a machine learning environment accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The identification and curation platform 110, on behalf of respective infrastructure tenants each corresponding to one or more users associated with respective ones of the user devices 102, implements one or more classifiers to perform API documentation classification. According to an embodiment, the infrastructure tenants are cloud infrastructure tenants. By way of example, the identification and curation services are assumed to include execution and training of one or more machine learning applications on behalf of each of one or more users associated with respective user devices 102, to predict classifications of API documents.

The identification and curation platform 110 in some embodiments may be implemented as part of a cloud infrastructure in the form of a cloud-based system such as an AWS system. Other examples of cloud-based systems that can be used to provide at least portions of the identification and curation platform 110 and possibly other portions of system 100 include GCE, and Microsoft Azure®.

In accordance with an embodiment of the present invention, the identification and curation platform 110 provides automated tools for retrieval, classification and presentation of desired content from API documentation. For example, regardless of input file format, the identification and curation platform 110 correlates metadata information from different API document sources to generate API documentation with improved quality and more accurate content than API documentation developed by conventional techniques, which cannot be applied across varied input formats, and are not able to keep pace with API revisions and updates.

The identification and curation platform 110 in the embodiment of FIG. 1 illustratively comprises one or more first pass classifiers 120 and one or more second pass classifiers 130 which output a plurality of classified API documents 140, which can be published for users of the user devices 102 using publishing tools 150. In accordance with an embodiment of the present invention, the identification and curation platform 110 receives as inputs from multiple sources a plurality of API documents respectively configured as electronic files in a variety of input formats. The input formats include, but are not necessarily limited to, extensible markup language (XML), JavaScript Object Notation (JSON), Pydoc, Microsoft Word®, txt, source code, or any other intelligible format.

The input sources include an internal document source (e.g., from within an enterprise supplying an API or API documentation), which includes, for example, an internal document cloud environment 109, and an external document source (e.g., from outside of an enterprise supplying an API or API documentation), which includes, for example, an external document cloud 107, such as, an open source cloud environment. In accordance with an embodiment of the present invention, the internal document cloud environment 109 can include, but is not necessarily limited to, documents from different lines-of-business (LOBs) 106-1, 106-2, . . . , 106-N, and a number of API documents based on, for example, a number of API products, a number of product versions, a number of document releases, and a number of types of product documents. As can be understood, the number of documents can grow exponentially, as each of these values is multiplied by the next value. The external document cloud environment 107 can include, but is not necessarily limited to, API documents from external databases of documentation files, and from social media sources, such as, for example, blogs, forums, and question and answer websites. Like the internal document cloud environment 109, the external document cloud environment 107 can include, but is not necessarily limited to documents from different LOBs, and the number of API documents can be based on, for example, a number of API products, product versions, document releases, and types of product documents. Similar to the external document cloud environment 107, the internal document cloud environment 109 can include, but is not necessarily limited to, internal databases of documentation files, and internal blogs, forums, and question and answer sites.

In accordance with an embodiment of the present invention, the first classifier 120 analyzes the electronic files from the external and/or document cloud environments 107 and 109 to determine whether one or more schema types are present in the electronic files. More specifically, the first pass classifier 120 checks the schema of the electronic files for known schema types such as, for example, managed object format (MOF), web services description language (WSDL), and conceptual schema definition language (CSDL), respectively. Once the schema elements are identified, the first pass classifier 120 validates and parses the identified schema types and generates classifications based on the one or more schema types for the electronic files determined to include the one or more schema types. The first pass classifier 120 identifies patterns in the electronic files which match with the one or more schema types and outputs the classified files having the matching patterns to a first level classification database 125.

If the one or more first pass classifiers 120 are not able to classify the input documents by identifying one or more known schema types, one or more second pass classifiers 130 are invoked. The second pass classifier 130 includes an intelligent classifier that is trained with training data including, for example, known API vocabulary, API grammar and/or API identifiers. Additionally, based on different customer requirement formats, the platform 110 can generate documentation sets in different formats, such as, for example, PDF, XML, HTML or PyDoc file formats, and playbooks are generated outputs in PyDoc format that can be consumed by an open source platform. In connection with training, different sample playbooks from different contributors (e.g., companies) producing open source APIs for similar products, can be used as training data, where they are producing open source APIs for similar LOBs or product sets. The training data for the second pass classifier 130 is stored and retrieved from a training data database 134.

The second pass classifier 130 analyzes the electronic files determined not to include the one or more schema types. The analysis by the second pass classifier 130 is performed using one or more predictive classifiers generated via one or more machine learning techniques. The second pass classifier 130 generates a classification based on the one or more predictive classifiers for the electronic files determined not to include the one or more schema types. According to an embodiment of the present invention, the one or more predictive classifiers include API classification vectors, which are generated using, for example, term frequency-inverse document frequency (TF-IDF) vectorization.

According to an embodiment of the present invention, the second pass classifier 130 invokes an artificial neural network (ANN) model to classify the plurality of API classification vectors into API formats and reject non-API data.

The second pass classifier 130 classifies API versus non-API data. Unlike the first pass classifier 120, which can classify known data formats, the second pass classifier 130 is a document classifier for unknown data formats, which can be designed using ANNs, and with machine learning approaches may be trained with sample data sets and feedback from the predictor error calculation component 132 to retrain the model and classify the API versus non-API data.

The second pass classifier 130 can include a plurality of intelligent classification technologies. In one or more embodiment, referring to FIG. 2, the second pass classifier 130 includes an ANN document classification model. More specifically, a multi-layer perceptron (MLP) model 200 is used to classify the input vectors (i.e., predictive classifiers) into API formats and reject non API data. The inputs to the model, including, for example, API identifiers 201, API prototypes 203, API error identifiers 205, and other vocabulary inputs 207 comprise word vectors derived from a tokenizer following a standard of "bag of words" vocabulary. In general, when using a "bag of words" model, words are processed to remove punctuation, remove words that are not purely comprised of alphabetical characters, remove known stop words, and remove words having less than a specified length. More words result in a larger representation of documents. As a result, the model constrains the words to only those determined to be predictive. Due to the difficulty in determining what is predictive, different hypotheses about how to construct a useful vocabulary are tested.

The bag of words model extracts features from text so the text input can be used with machine learning algorithms like neural networks. Each API document is converted into a vector representation. The number of items in the vector representing the document corresponds to the number of words in the vocabulary. For example, a larger vocabulary results in a longer vector representation than a smaller vocabulary.

Figure 2:
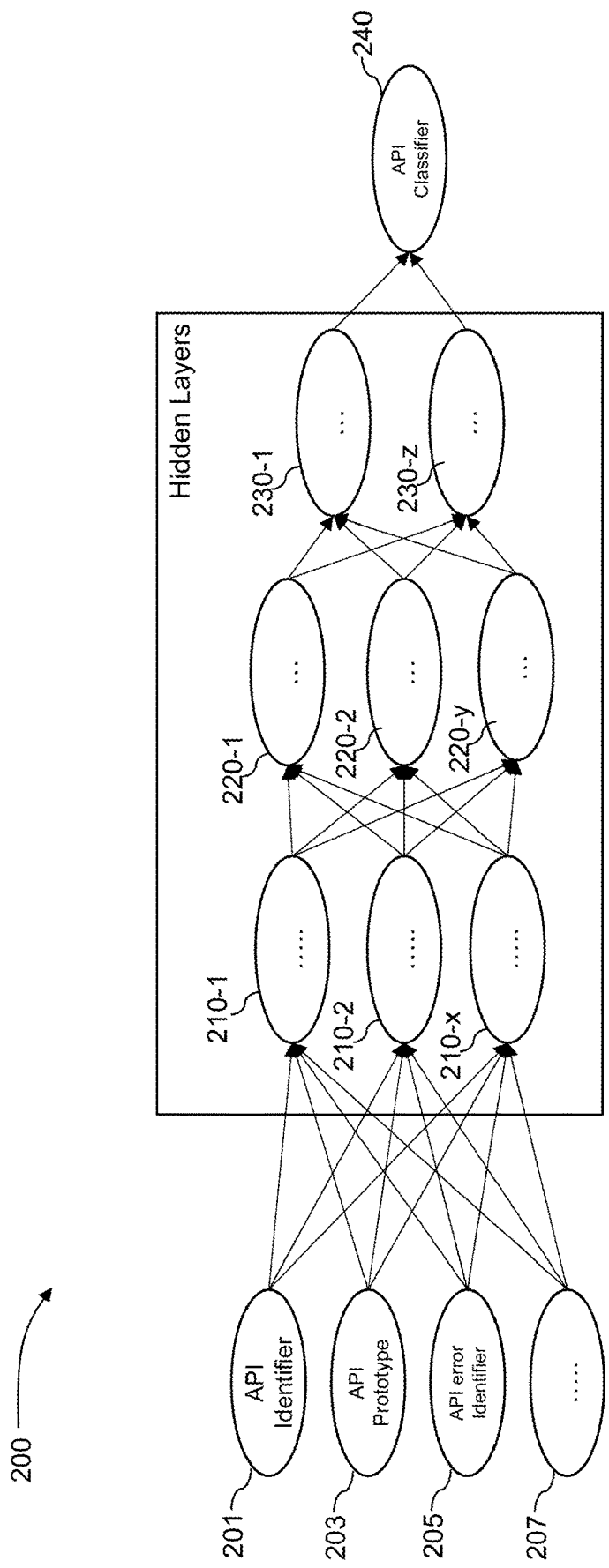
FIG. 2 is a block diagram of an artificial neural network (ANN) document classification model in an illustrative embodiment.

As shown in FIG. 2, the inputs 201, 203, 205 and 207 are processed by a plurality of hidden neural network layers 210-1, 210-2, . . . , 210-x, 220-1, 220-2, . . . 220-y, 230-1, . . . 230-z (e.g., convolutional layers, fully connected layers, etc.) at a plurality of levels to result in the API classification vectors 240. The inputs 201, 203, 205 and 207 to the MLP model 200 are derived by a set of pre-defined parameters/patterns that the system searches for in a document and retrieves from the document. The MLP model 200 classifies the documents as API or non-API. The platform 110 implements these techniques to ensure consumption of any API related content from codebase or any other associated reference documents.

The embodiments of the present invention are not necessarily limited to the multi-layer perceptron model illustrated in FIG. 2, and alternative embodiments of the present invention may utilize different structures for the second pass classifier 130 and the components thereof. For example, a text parser with regular expression (regex) patterns may be used in a second pass classifier 130 provided an input set is limited and does not include wide variations.

In accordance with an embodiment of the present invention, the training data set for the second pass classifier 130 is generated by training one or more neural networks on a customized text corpus. The customized text corpus is dynamic in that it includes a continuously growing vocabulary and is continuously being retrained until an acceptable degree of correctness is obtained. The identification and curation platform 110 includes a predictor error calculation component 132 which performs statistical calculations to assess the quality of and validate the machine learning models used by the second pass classifier 130, and whether retraining is required.

According to one or more embodiments, the second pass classifier 130 is generated by training Word2vec models on the customized corpus. Word2vec models include a group of related models comprising shallow, two-layer neural networks that are trained to reconstruct linguistic contexts of words. Word2vec takes as its input the customized corpus of text and produces a vector space, typically of several hundred dimensions, and assigns each unique word in the corpus to a corresponding vector in the space. The positioning of the word vectors in the vector space locates words that share common contexts in the corpus in close proximity to one another in the space.

Referring to FIG. 1, the plurality of classified API documents 140 are output from the first pass classifier 120 and/or the first level classification database 125 and the second pass classifier 130. The electronic files of the classified API documents transmitted to a publishing tools component 150, which includes one or more documentation tools to create user consumable formats of API documentation for retrieval and consumption by one or more users of the user devices 102 over the network 104. On or more embodiments of the present invention permit sourced data, information and/or content (e.g., electronic files of the classified API documents) to be stored in a centralized repository, so that any relevant API on one or more servers 105 or user devices 102 can easily consume the data at any given time.

According to one or more embodiments of the present invention, the API documentation is presented in a plurality of formats depending on user system specifications and/or needs of the users of the user devices 102. The plurality of formats include, but are not necessarily limited to, reference API documentation, class level documentation, domain oriented documentation, and/or workflow usage scenario documentation, as well as hypertext markup language (HTML) and portable document format (PDF). Accordingly, embodiments of the present invention can process content from input files in any format, such as, for example, Python, HTML and JSON file formats and generate an API guide in one or more desired formats.

The classified documents 140 are classified based on, for example, common API definitions 143 and metadata 145, corresponding to, for example, API operations, parameters, and schema patterns. The classification accurately organizes API documentation based on API types or specified workflows for usage scenarios.

According to an embodiment of the present invention, one or more machine learning algorithms discussed herein execute volumetric data grouping including capturing large amounts of data (e.g., terabytes and/or gigabytes of data). In general, machine learning techniques and components used in accordance with embodiments of the present invention may include, but are not necessarily limited to, neural networks, a Support Vector Machine (SVM), a Multilayer Perceptron (MLP), a deep learning model, decision trees, and clustering.

The first and second pass classifiers 120 and 130, the predictor error calculation component 132, the publishing tools 150, and other components of the identification and curation platform 110 comprise further hardware and software required for running the identification and curation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The databases or cloud environments discussed herein (e.g., first level classification, and training data databases 125 and 134, and external and internal document cloud environments 107 and 109) may comprise a database service, such as, but not necessarily limited to GCE Cloud Storage, Microsoft Azure Blob (Binary Large Object) Storage, DynamoDB, MongoDB, Amazon Aurora and Oracle database.

The identification and curation performed by the identification and curation platform 110 can be performed based on real-time data from multiple sources retrieved over the network(s) 104, so that the information processing system can react to events as they happen. For example, the input data sources may include API document updates reflecting, for example, new API products, new API product versions or modifications and/or new or modified API guide releases captured in real-time, which may be processed by the first and second pass classifiers 120, 130 to provide classified documents 140 for the end users of the user devices 102 reflecting real-time API and API documentation updates.

Although the first and second pass classifiers 120 and 130, the predictor error calculation component 132, the publishing tools 150, and other components of the identification and curation platform 110 in the present embodiment are shown as part of the identification and curation platform 110, at least a portion of the first and second pass classifiers 120 and 130, the predictor error calculation component 132, the publishing tools 150, and other components of the identification and curation platform 110 in other embodiments may be implemented on one or more other processing platforms that are accessible to the identification and curation platform 110 over one or more networks. Such components can each be implemented at least in part within another system element or at least in part utilizing one or more stand-alone components coupled to the network 104.

The databases described herein are assumed to comprise one or more storage systems configured to store information relating to processing performed, data used, and to other functionality of the identification and curation platform 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of identification and curation platform 110 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the identification and curation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the first and second pass classifiers 120 and 130, the predictor error calculation component 132, the publishing tools 150, and other components of the identification and curation platform 110, and the elements thereof can each be implemented in the form of one or more LXCs running on one or more VMs. Other arrangements of one or more processing devices of a processing platform can be used to implement the first and second pass classifiers 120 and 130, the predictor error calculation component 132, the publishing tools 150, as well as other components of the identification and curation platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the identification and curation platform 110 to reside in different data centers. Numerous other distributed implementations of the identification and curation platform 110 are possible.

Accordingly, one or each of the first and second pass classifiers 120 and 130, the predictor error calculation component 132, the publishing tools 150, and other components of the identification and curation platform 110 can each be implemented in a distributed manner so as to comprise a plurality of distributed components implemented on respective ones of a plurality of compute nodes of the identification and curation platform 110.

It is to be appreciated that these and other features of illustrative embodiments are presented by way of example only, and should not be construed as limiting in any way.

Accordingly, different numbers, types and arrangements of system components such as the first and second pass classifiers 120 and 130, the predictor error calculation component 132, the publishing tools 150, and other components of the identification and curation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the identification and curation platform and machine learning services can be offered to cloud infrastructure customers or other users as part of FaaS and/or PaaS offerings.

The operation of the information processing system 100 will now be described in further detail with reference to the flow diagram of FIG. 3. The process 300 as shown includes steps 301 through 311, and is suitable for use in the system 100 but is more generally applicable to other types of information processing systems comprising an identification and curation platform configured for identifying and organizing API data from different source files.

In step 301, the process 300 includes receiving as inputs a plurality of API documents. The plurality of API documents are respectively configured as electronic files. The electronic files are respectively configured in a plurality of formats, and comprise metadata content for API data.

Referring to steps 303 and 305, the electronic files are analyzed via a first classifier to determine whether one or more schema types are present in the electronic files, and a first classification is generated based on the one or more schema types for the electronic files determined to include the one or more schema types. The one or more schema types comprise, for example, MOF, WSDL and/or CSDL, and are validated and parsed.

Referring to step 307, the electronic files for the electronic files determined not to include the one or more schema types are analyzed via a second classifier. The analyzing via the second classifier is performed using one or more predictive classifiers generated via one or more machine learning techniques. In step 309, a second classification based on the one or more predictive classifiers is generated for the electronic files determined not to include the one or more schema types. The predictive classifiers comprise a plurality of API classification vectors, which can be generated using TF-IDF vectorization. An artificial neural network model is invoked to classify the plurality of API classification vectors into API formats and reject non-API data.

The process further includes at step 311, outputting a plurality of classified API documents based on the first and second classifications. The plurality of classified API documents may comprise API reference documents comprising API definitions and metadata.

The process 300 may further include generating a training data set for the second classifier by training a neural network on a customized text corpus, wherein the customized text corpus is dynamic.

Figure 3:
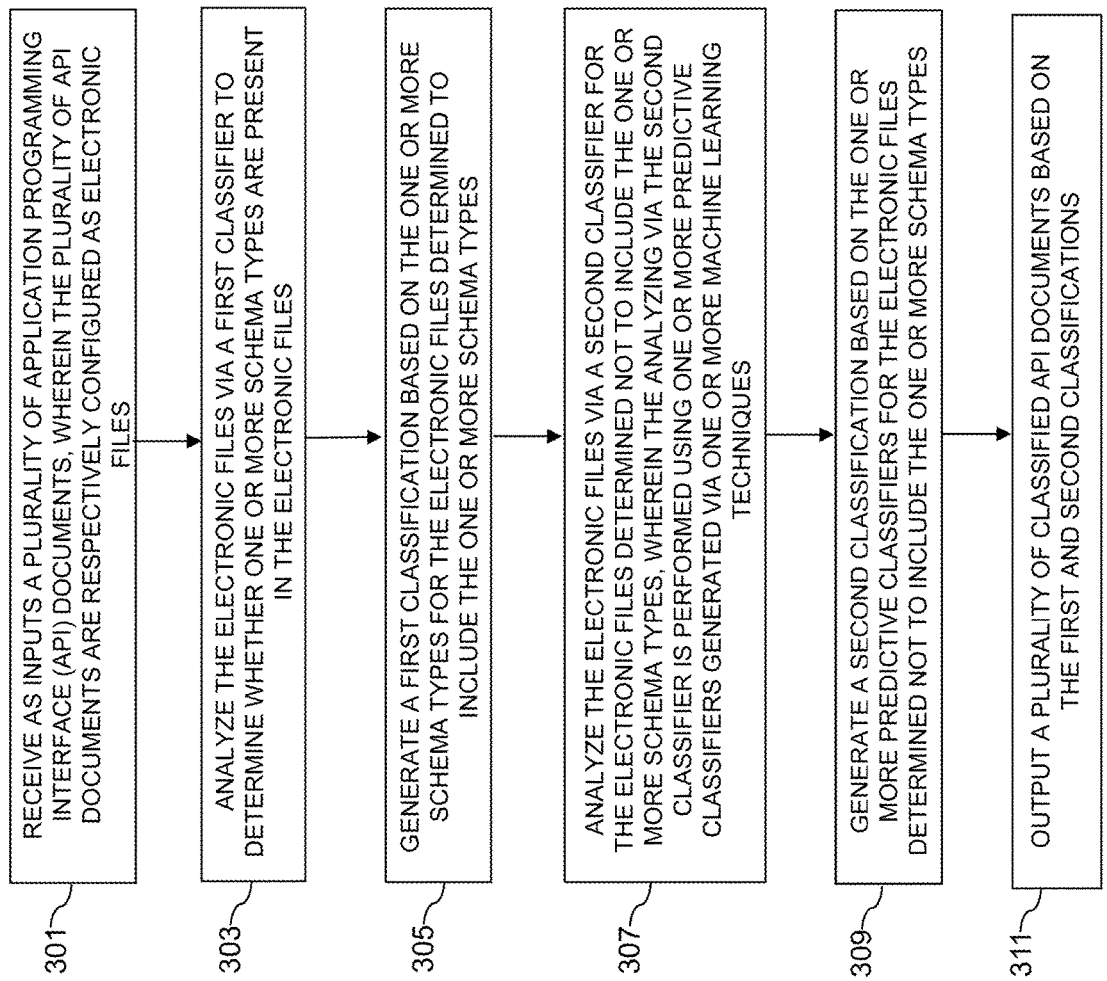
FIG. 3 is a flow diagram of a process for identifying and organizing application programming interface (API) data from different source files in an illustrative embodiment.

It is to be appreciated that the FIG. 3 process and other features and functionality described above can be adapted for use with other types of information systems configured to execute identification and curation services on an identification and curation platform or other type of processing platform.

The particular processing operations and other system functionality described in conjunction with the flow diagram of FIG. 3 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an identification and curation platform as disclosed herein can provide a number of significant advantages relative to conventional arrangements. For example, embodiments of the present invention are configured to address problems with identification of API related data, information and/or content from different source files (e.g., internal and external sources) in varied file formats. Currently, there are no techniques or solutions which can aggregate relevant API data, information and/or content irrespective of input format. As an additional advantage, embodiment of the present invention permit sourced data, information and/or content (e.g., classified documents) to be stored in a centralized repository, so that any relevant API can easily consume the data at any given time. In another advantage, embodiments of the present invention provide a unified platform to avoid any conflicts among different API product lines, which can simultaneously produce API documents having a unified format for different API products.

Conventional computer driven techniques for curation of API information result in inconsistencies between API documentation across different products. Currently, there is no mechanism for identifying and curating API information in multiple formats via different source code, and for capturing training data reflecting real-time updates for APIs and API documents. Conventional techniques also fail to provide task-based API information. Task-based API information, for example, refers to documentation related to a workflow, for instance, discovering or performing a particular type of monitoring, etc.

Presently, there are no processes for differentiating between different types of content sets and determining if they are suitable for API driven information. API specific content can originate from different and scattered information sources, and there are no techniques for accurately retrieving the scattered information. Furthermore, current alphabetic presentations of API information do not convey organization of the elements (management domain) or workflows for usage scenarios with real time implementation possibilities.

Advantageously, the embodiments of the present invention deliver a unified solution that can be implemented on any set of APIs to automatically generate harmonized API documentation, even though API structures are different for different products. Conventional tools are custom-made for a specific type of inputs. However, the first and second classifier structure of the identification and curation platform of the embodiments of the present invention can consume content from any type of input file and generate API guides in multiple formats. The embodiments of the present invention provide automated identification of API structures, retrieve content from any API document source file, and correlate metadata information of various API information sources to improve the quality of API documents.

Using conventional processing techniques, as updated API documents are released, updating of profiles of API documentation requires large amounts of manual intervention, and is prone to processing and human errors. In addition, maintaining the quality, comprehensiveness, and relevance of thousands of pages of API documentation is not possible using conventional techniques as new releases with new information are continuously published.

The embodiments of the present invention effectively manage such scenarios to improve the accuracy and usability of various documents and at the same time reduce or eliminate the need for manual intervention. With the disclosed embodiments, different formats of documents are automatically generated from the same underlying information sources and databases. For example, using the pattern matching and machine learning techniques of the classifiers 120 and 130 of the identification and curation platform 110, API documents corresponding to different purposes retrieved from the same information sources can be categorized and processed to produce API documentation for different purposes. For example, reference API documentation, class level documentation, domain oriented documentation, and/or workflow usage scenario documentation can be automatically generated from the same underlying information sources by using the automated classifiers of the identification and curation platform 110.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the identification and curation platform 110 or portions thereof are illustratively implemented for use by tenants of such a multi-tenant environment.

As mentioned previously, cloud infrastructure as disclosed herein can include cloud-based systems such as AWS, GCE and Microsoft Azure. Virtual machines provided in such systems can be used to implement at least portions of one or more of a computer system and an identification and curation platform in illustrative embodiments. These and other cloud-based systems in illustrative embodiments can include object stores such as AWS S3, GCE Cloud Storage, and Microsoft Azure Blob Storage.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
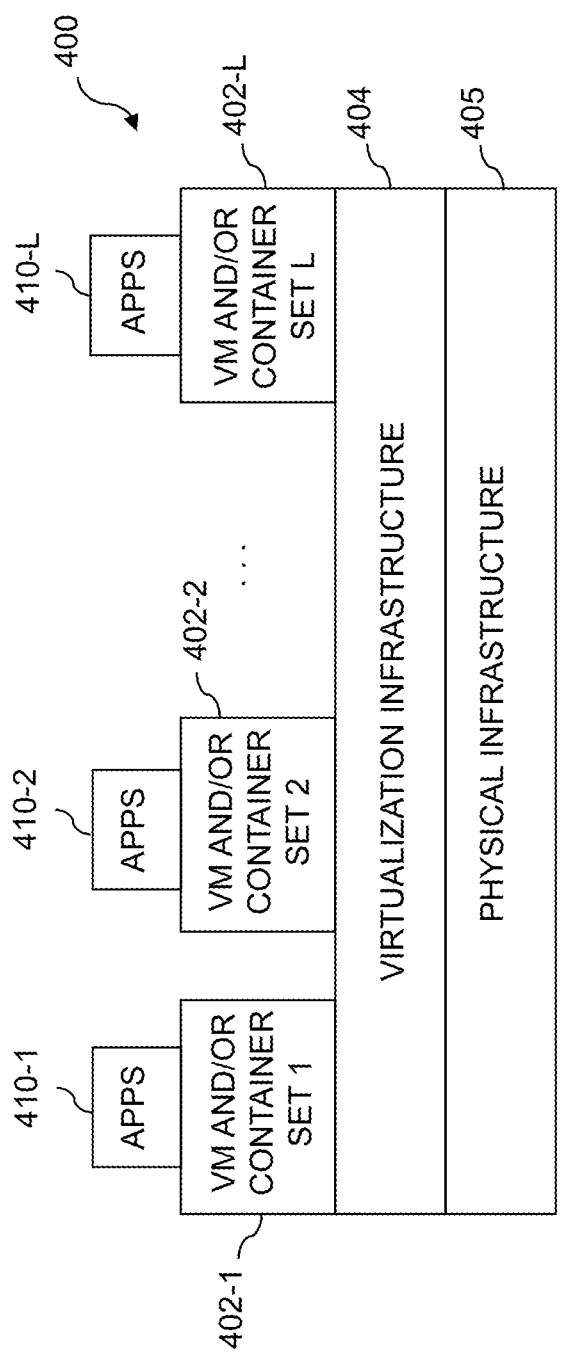
FIGS. 4 and 5 show examples of processing platforms that may be utilized to implement at least a portion of an information processing system in illustrative embodiments.
Figure 5:
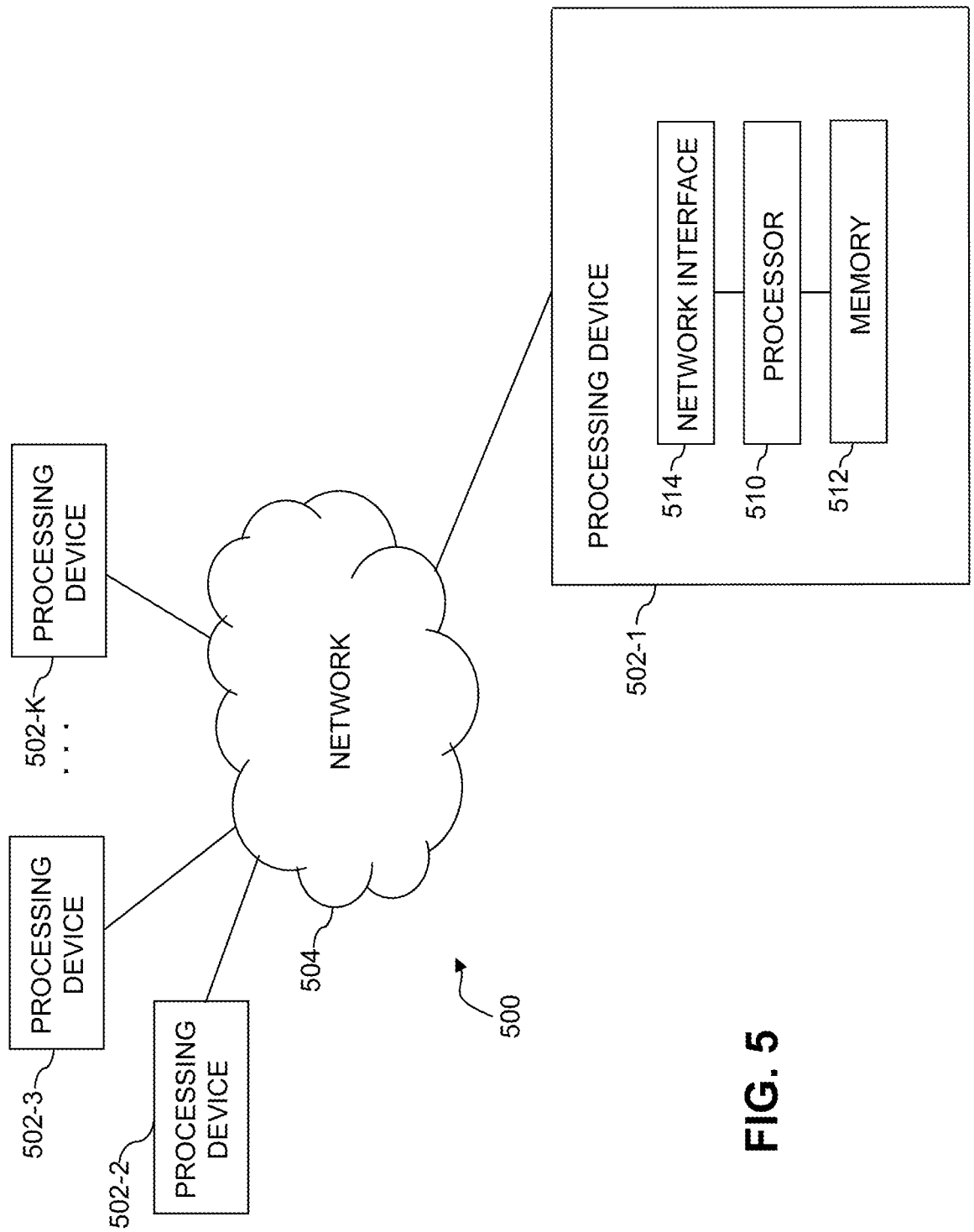

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide identification and curation functionality of the type described above for one or more processes running on a given one of the VMs. For example, each of the VMs can implement user specific layout management, document theme analysis, document management and/or feedback and training for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide identification and curation functionality of the type described above for one or more processes running on different ones of the containers. For example, a container host device supporting multiple containers of one or more container sets can implement one or more instances of user specific layout management, document theme analysis, document management and/or feedback and training.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512. The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the identification and curation platform 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and identification and curation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured to:
   receive as inputs a plurality of application programming interface (API) documents, wherein the plurality of API documents are respectively configured as electronic files;
   analyze the electronic files via a first classifier to determine whether one or more schema types are present in the electronic files;
   generate a first classification based on the one or more schema types for a first set of the electronic files determined to include the one or more schema types;
   analyze a second set of the electronic files via a second classifier responsive to a negative determination regarding whether the one or more schema types are present in the second set of the electronic files, wherein the analyzing via the second classifier is performed using one or more predictive classifiers generated via one or more machine learning techniques;
   generate a second classification based on the one or more predictive classifiers for the second set of the electronic files; and
   output a plurality of classified API documents based on the first and second classifications;
   wherein the one or more schema types comprise at least one of a managed object schema type, a web service schema type, and a conceptual definition schema type.

2. The apparatus of claim 1 wherein the electronic files are respectively configured in a plurality of formats.

3. The apparatus of claim 2 wherein the electronic files comprise metadata content for API data.

4. The apparatus of claim 1 wherein the managed object schema type comprises managed object format (MOF), the web service schema type comprises web services description language (WSDL), and the conceptual definition schema type comprises conceptual schema definition language (CSDL).

5. The apparatus of claim 1 wherein said at least one processing platform is further configured to validate and parse the one or more schema types.

6. The apparatus of claim 1 wherein the predictive classifiers comprise a plurality of API classification vectors.

7. The apparatus of claim 6 wherein said at least one processing platform is further configured to generate the plurality of API classification vectors using term frequency-inverse document frequency (TF-IDF) vectorization.

8. The apparatus of claim 6 wherein said at least one processing platform is further configured to invoke an artificial neural network model to classify the plurality of API classification vectors into API formats and reject non-API data.

9. The apparatus of claim 1 wherein said at least one processing platform is further configured to generate a training data set for the second classifier by training a neural network on a customized text corpus.

10. The apparatus of claim 9 wherein the customized text corpus is dynamic.

11. The apparatus of claim 1 wherein the plurality of classified API documents comprise API reference documents comprising API definitions.

12. The apparatus of claim 1 wherein the plurality of classified API documents comprise API reference documents comprising metadata.

13. A method comprising:
   receiving as inputs a plurality of application programming interface (API) documents, wherein the plurality of API documents are respectively configured as electronic files;
   analyzing the electronic files via a first classifier to determine whether one or more schema types are present in the electronic files;
   generating a first classification based on the one or more schema types for a first set of the electronic files determined to include the one or more schema types;
   analyzing a second set of the electronic files via a second classifier responsive to a negative determination regarding whether the one or more schema types are present in the second set of the electronic files, wherein the analyzing via the second classifier is performed using one or more predictive classifiers generated via one or more machine learning techniques;
   generating a second classification based on the one or more predictive classifiers for the second set of the electronic files; and
   outputting a plurality of classified API documents based on the first and second classifications;
   wherein the one or more schema types comprise at least one of a managed object schema type, a web service schema type, and a conceptual definition schema type; and
   wherein the method is performed by at least one processing platform comprising at least one processing device comprising a processor coupled to a memory.

14. The method of claim 13 wherein the managed object schema type comprises managed object format (MOF), the web service schema type comprises web services description language (WSDL), and the conceptual definition schema type comprises conceptual schema definition language (CSDL).

15. The method of claim 13 further comprising validating and parsing the one or more schema types.

16. The method of claim 13 wherein the predictive classifiers comprise a plurality of API classification vectors.

17. The method of claim 16 further comprising generating the plurality of API classification vectors using term frequency-inverse document frequency (TF-IDF) vectorization.

18. The method of claim 16 further comprising invoking an artificial neural network model to classify the plurality of API classification vectors into API formats and reject non-API data.

19. The method of claim 13 further comprising generating a training data set for the second classifier by training a neural network on a dynamic customized text corpus.

20. A computer program product comprising a non-transitory processor-readable storage medium having stored therein program code of one or more software programs, wherein the program code when executed by at least one processing platform causes said at least one processing platform to:

receive as inputs a plurality of application programming interface (API) documents, wherein the plurality of API documents are respectively configured as electronic files;

analyze the electronic files via a first classifier to determine whether one or more schema types are present in the electronic files;

generate a first classification based on the one or more schema types for a first set of the electronic files determined to include the one or more schema types;

analyze a second set of the electronic files via a second classifier responsive to a negative determination regarding whether the one or more schema types are present in the second set of the electronic files, wherein the analyzing via the second classifier is performed using one or more predictive classifiers generated via one or more machine learning techniques;

generate a second classification based on the one or more predictive classifiers for the second set of the electronic files; and output a plurality of classified API documents based on the first and second classifications;

wherein the one or more schema types comprise at least one of a managed object schema type, a web service schema type, and a conceptual definition schema type.

* * * * *